US012561686B2

(12) United States Patent
Shallal et al.

(10) Patent No.: US 12,561,686 B2
(45) Date of Patent: Feb. 24, 2026

(54) SYSTEMS AND METHODS FOR OUTLIER DETECTION USING UNSUPERVISED MACHINE LEARNING MODELS TRAINED ON BALANCED DATA

(71) Applicant: Capital One Services, LLC, McLean, VA (US)

(72) Inventors: Hassan Shallal, Plano, TX (US); Rajesh Kanna Durairaj, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 15 days.

(21) Appl. No.: 18/300,340

(22) Filed: Apr. 13, 2023

(65) Prior Publication Data

US 2024/0346505 A1 Oct. 17, 2024

(51) Int. Cl.
*G06Q 20/40* (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS

| | | | | |
|---|---|---|---|---|
| 10,462,172 | B1 * | 10/2019 | Sadaghiani | ............ G06N 20/20 |
| 10,848,508 | B2 * | 11/2020 | Chen | ........................ G06N 3/09 |
| 10,873,456 | B1 | 12/2020 | Dods et al. | |
| 11,194,691 | B2 * | 12/2021 | Dherange | ........... G06F 18/2433 |
| 11,288,673 | B1 * | 3/2022 | Venturelli | ............. G06F 18/214 |
| 11,509,674 | B1 * | 11/2022 | Beauchesne | ........ H04L 63/1425 |
| 11,526,606 | B1 | 12/2022 | Li | |
| 11,983,720 | B2 | 5/2024 | Ibrahim et al. | |
| 2017/0134412 | A1 * | 5/2017 | Cheng | .................... H04L 67/306 |
| 2019/0132343 | A1 * | 5/2019 | Chen | ...................... G06N 3/084 |
| 2019/0213605 | A1 | 7/2019 | Patel et al. | |
| 2020/0118136 | A1 * | 4/2020 | Zhang | .................. G06Q 20/405 |

(Continued)

OTHER PUBLICATIONS

Generating Better Search Engine Text Advertisements with Deep Reinforcement Learning, Hughes J. Weston, Chang Keng-hao, Zhang Ruofei, Applied Data Science Track Paper, Aug. 4-8, 2019 (Year: 2019).*

(Continued)

*Primary Examiner* — Daniel S Felten
*Assistant Examiner* — Kevin T Poe
(74) *Attorney, Agent, or Firm* — Foley & Lardner LLP

(57) ABSTRACT

Methods and systems are described herein for outlier detection. The system may apply a single-tier including a minority expert model only or a two-tier machine learning model, including a majority expert model and a minority expert model. The system may generate the minority expert model by training an unsupervised machine learning model on oversampled training data, including synthetic sample outlier events. In some embodiments, the minority expert model may provide a binary result indicating an event belongs to an outlier category or not. In some embodiments, the minority expert model may include multiple component models providing a multi-class result indicating whether an event belongs to a sub-category of the outlier category. In application, the system may perform the outlier detection on events that are sequence-based or not.

20 Claims, 8 Drawing Sheets

(56)        References Cited

U.S. PATENT DOCUMENTS

2020/0174902 A1*    6/2020  Buda ..................... G06F 11/079
2020/0387797 A1*   12/2020  Ryan ...................... G06F 17/18
2021/0287071 A1     9/2021  Ben Fadhel et al.
2021/0304207 A1*    9/2021  Lo Faro ................ G06Q 40/02
2021/0406365 A1*   12/2021  Neil ...................... G06F 16/951
2023/0206329 A1     6/2023  Cella et al.
2024/0184284 A1*    6/2024  Nakagawa ............ G06N 20/00

OTHER PUBLICATIONS

Japkowicz "Supervised Versus Unsupervised Binary-Learning by Feedforward Neural Networks", 2001 (26 pages).
Final Office Action issued in U.S. Appl. No. 18/300,344 on Dec. 30, 2024 (88 pages).
Non-Final Office Action issued in U.S. Appl. No. 18/300,344 on Aug. 27, 2024 (77 pages).

* cited by examiner

| True positives (TP) | False Negatives (FN) |
|---|---|
| False positives (FP) | True Negatives (TN) |

500

600A

Receive event data set of an event
602

Input the event data set of the event to a majority expert model
604

Outlier category?
606

R → Designate the event as belonging to regular category
608

O

Input the event data set of the event to a minority expert model
610

Outlier category?
612

R

O

Designate the event as belonging to outlier category
614

700

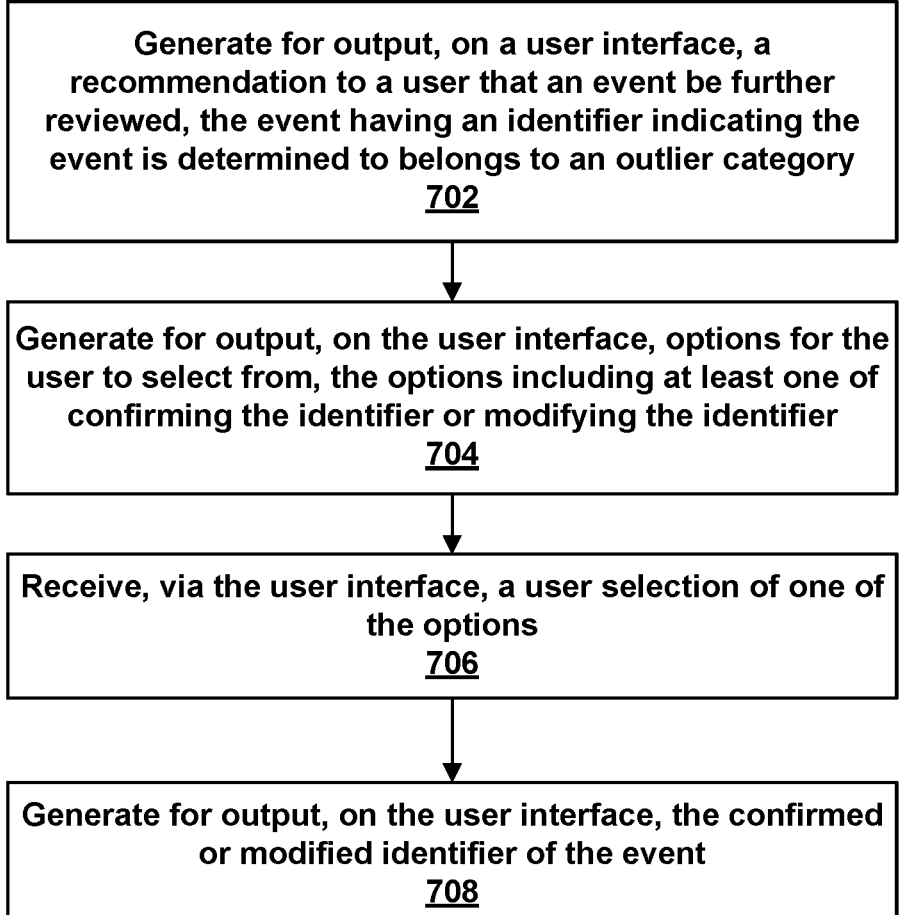

Generate for output, on a user interface, a recommendation to a user that an event be further reviewed, the event having an identifier indicating the event is determined to belongs to an outlier category
702

Generate for output, on the user interface, options for the user to select from, the options including at least one of confirming the identifier or modifying the identifier
704

Receive, via the user interface, a user selection of one of the options
706

Generate for output, on the user interface, the confirmed or modified identifier of the event
708

FIG. 7

SYSTEMS AND METHODS FOR OUTLIER DETECTION USING UNSUPERVISED MACHINE LEARNING MODELS TRAINED ON BALANCED DATA

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. Artificial intelligence often relies on large amounts of high-quality data. For example, an outlier detection model trained using imbalanced training data that include many more regular samples than outlier samples may have poor quality in that outlier events detected by the model may include a large percentage of false positives.

SUMMARY

Systems and methods are described herein for outlier detection (or referred to as anomaly detection). Outlier detection problems may be extremely imbalanced, featuring a disproportionately low percentage (e.g., less than roughly 1%) of a population of events representing the outlier sub-population (or referred to as a minority sub-population), while the remainder is the regular (or normal) sub-population (or referred to as a majority sub-population). Conventionally, a model used in an outlier detection may be trained on such extremely imbalanced data. For example, a model may be trained only on a majority sub-population that includes only sample regular events; in application, the trained model may be used to identify a new event as either regular (e.g., assigning a value of "1" to an event determined by the trained model to be regular) or outlier (e.g., assigning a value of "−1" to an event determined by the trained model to be outlier). However, the model so trained may be of low quality in that among the detected outlier events, there may exist a high percentage of false positives that are actually regular events. The low quality of the trained model may be due to one or more factors including, for example, the extremely imbalanced training data in which features of sample outlier events of the training data are ignored (e.g., sample outlier events being excluded from the training data) or obscured (e.g., too few sample outlier events being available compared to the sample regular events) in the model training.

To overcome these technical deficiencies, methods and systems disclosed herein may perform outlier detection using a minority expert model generated by training an unsupervised machine learning model using event data sets of sample outlier events. By allowing unsupervised learning from oversampled sample outlier events, the outlier detection using the minority expert model so trained may improve in terms of accuracy, efficiency, etc. Additionally, or alternatively, using synthetic outlier events in the model training may remedy the scarcity of sample outlier events. In some embodiments, the system may generate such synthetic outlier events by oversampling outlier events that have actually occurred. Thus, the system may train the majority expert model and the minority expert model on balanced training data, including sample regular events and sample outlier events of comparable amounts. According to embodiments of the present disclosure, the method and systems for outlier detection using the minority expert model so trained may have improved accuracy and/or efficiency compared to an outlier detection using a model trained on only sample regular events. In some embodiments, the minority expert model may include multiple component models for detecting sub-categories of outlier events, allowing a multi-class output by the minority expert model.

In some embodiments, the outlier detection may be performed using a single-tier model involving the minority expert model only or a two-tier model including a majority expert model and the minority expert model. In the single-tier model, the system may perform an outlier detection using the minority expert model only. In the two-tier model, the system may perform an outlier detection using a majority expert model and the minority expert model. The system can train the majority expert model using event data sets of sample regular events. In a multi-tier model, the system may perform an outlier detection using the majority expert model and the minority expert model, in which the minority expert model may include multiple component models configured to determine a sub-category of an event in the outlier category.

For example, the system and method of two-tier outlier detection may determine whether an event belongs to an outlier category that includes suspicious activities directed to an electronically access-controlled resource. In some embodiments, the system may receive an event data set of an event, input the event data set to a majority expert model, and receive, from the majority expert model, a first output predicting whether the event belongs to an outlier category. In response to the first output predicting that the event belongs to the outlier category, the system may input the event data set of the event to the minority expert model, and receive, from the minority expert model, a second output. The second output may indicate whether the event is determined to belong to the outlier category using an identifier.

In some embodiments, the system and method may process event data sets of a plurality of events. Based on the first outputs and/or second outputs of the plurality of events from the majority expert model and the minority expert model, the system and method may achieve additional technical benefits. For example, the system may generate a recommended subset among the plurality of events for output, wherein the recommended subset includes events that both the majority expert model and the minority expert model determine to belong to the outlier category. As another example, for an event that both the majority expert model and the minority expert model determine to belong to the outlier category (e.g., an event in the recommended subset), the system may generate a prompt inviting a user to confirm or modify its identifier indicating whether the event is determined to belong to the outlier category.

In some embodiments, the system may process sequence-based events (or referred to as time-series events). For example, the system may process a plurality of events using the majority expert model, and does not involve the minority expert model until the majority expert model detects an outlier event in the plurality of events. Upon detecting the outlier event, the system may input the outlier event to the minority expert model for analysis. Additionally or alternatively, upon detecting the outlier event, the system may generate a minority expert model, or update an existing minority expert model based on the outlier event. Merely by way of example, the system may generate one or more synthetic outlier events based on the detected outlier event, and generate or update the minority expert model based on the detected outlier event and/or the synthetic outlier event(s).

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part, or the entirety (i.e., the entire portion), of a given item (e.g., data) unless the context clearly dictates otherwise.

BRIEF DESCRIPTION OF THE DRAWINGS

FIG. 7 illustrates a flowchart of the process for user interaction directed to an outlier event, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
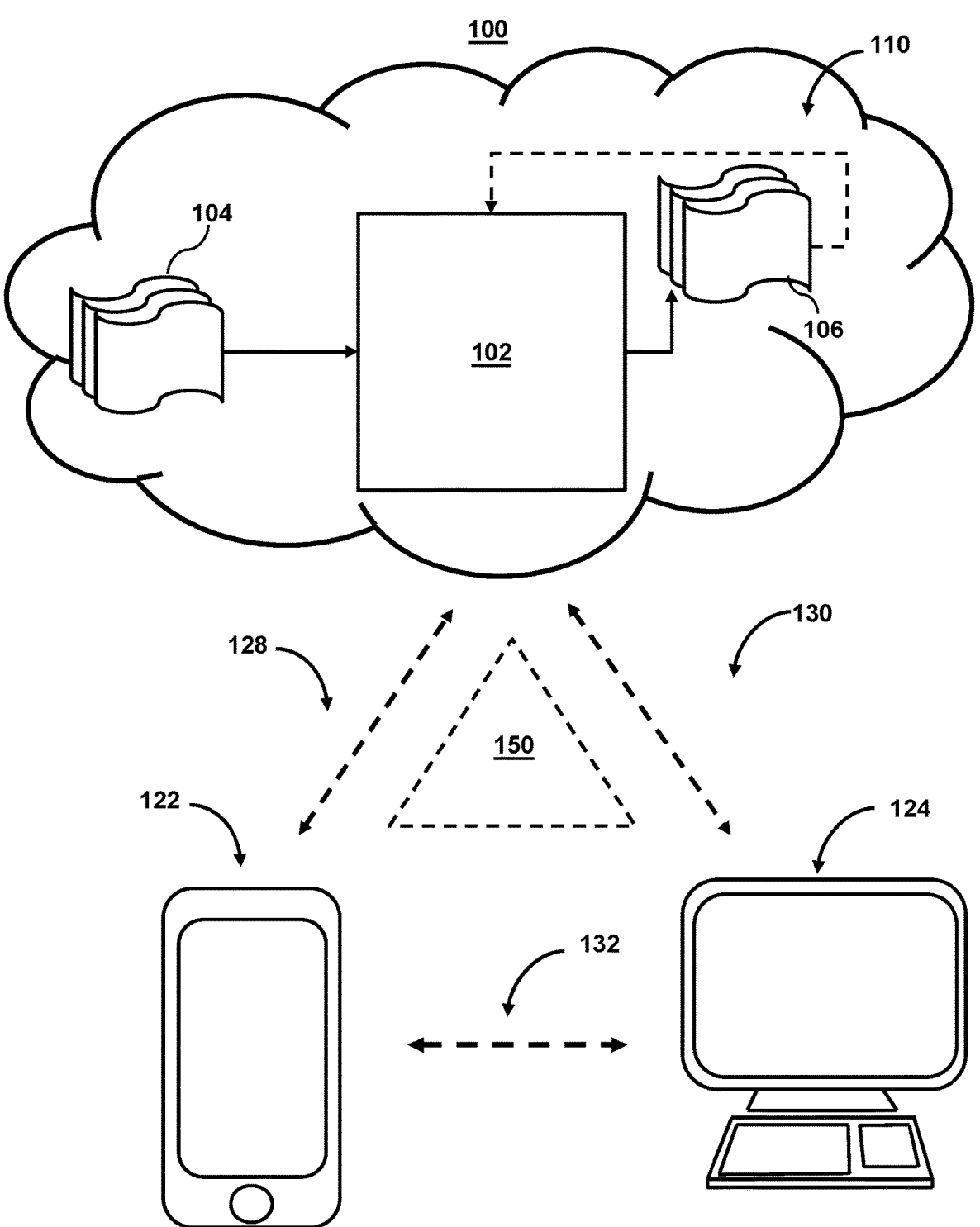
FIG. 1 shows illustrative components for performing outlier detection, in accordance with one or more embodiments.

FIG. 1 shows illustrative components for performing outlier detection, in accordance with one or more embodiments. For example, FIG. 1 shows illustrative components for using two-tier outlier detection. As shown in FIG. 1, system 100 may include mobile device 122 and user terminal 124. While shown as a smartphone and personal computer, respectively, in FIG. 1, it should be noted that mobile device 122 and user terminal 124 may be any computing device, including, but not limited to, a laptop computer, a tablet computer, a handheld computer, and other computer equipment (e.g., a server), including "smart," wireless, wearable, and/or mobile devices. FIG. 1 also includes cloud components 110. Cloud components 110 may alternatively be any computing device as described above, and may include any type of mobile terminal, fixed terminal, or other device. For example, cloud components 110 may be implemented as a cloud computing system, and may feature one or more component devices. It should also be noted that system 100 is not limited to three devices. Users may, for instance, utilize one or more devices to interact with one another, one or more servers, or other components of system 100. It should be noted, that, while one or more operations are described herein as being performed by particular components of system 100, these operations may, in some embodiments, be performed by other components of system 100. As an example, while one or more operations are described herein as being performed by components of mobile device 122, these operations may, in some embodiments, be performed by components of cloud components 110. In some embodiments, the various computers and systems described herein may include one or more computing devices that are programmed to perform the described functions. Additionally, or alternatively, multiple users may interact with system 100 and/or one or more components of system 100. For example, in some embodiments, a first user and a second user may interact with system 100 using two different components.

With respect to the components of mobile device 122, user terminal 124, and cloud components 110, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 1, both mobile device 122 and user terminal 124 include a display upon which to display data (e.g., notifications).

As referred to herein, a "user interface" may comprise a human-computer interaction and communication in a device, and may include display screens, keyboards, a mouse, and the appearance of a desktop. For example, a user interface may comprise a way a user interacts with an application or a website. A notification may comprise any content.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

Additionally, as mobile device 122 and user terminal 124 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 100 may run an application (or another suitable program). The application may cause the processors and/or control circuitry to perform operations related to outlier detection, generating dynamic replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., electrically erasable programmable read-only memory (EEPROM), random-access memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

For example, each of these devices may comprise a knowledge database that represents data and/or metadata on previously developed models (e.g., when the respective models were generated or updated, parameters of such models, the performance of the respective models, etc.). The knowledge database may include archived information related to potential model uses, maintenance, and/or updates. Additionally, or alternatively, the knowledge database may include archived information related to training data used in previous model training, maintenance, and/or updates. For example, this information may include one or more algorithms and relevant parameters of the algorithm(s) generated in generating synthetic outlier events as training data.

FIG. 1 also includes communication paths 128, 130, and 132. Communication paths 128, 130, and 132 may include the Internet, a mobile phone network, a mobile voice or data network (e.g., a 5G or Long Term Evolution (LTE) network), a cable network, a public switched telephone network, or other types of communications networks or combinations of communications networks. Communication paths 128, 130, and 132 may separately or together include one or more communications paths, such as a satellite path, a fiber-optic path, a cable path, a path that supports Internet communications (e.g., Internet Protocol television (IPTV)), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 110 may include model 102, which may be one or more machine learning models, artificial intelligence models, etc. (which may be referred to collectively herein as "models"). Model 102 may take inputs 104 and provide outputs 106. The inputs may include multiple data sets, such as a training data set and a test data set. Each of the plurality of data sets (e.g., inputs 104) may include an event data set related to an event. In some embodiments, outputs 106 may be fed back to model 102 as input to train model 102 (e.g., alone or in conjunction with user indications of the accuracy of outputs 106, labels associated with the inputs, or with other reference feedback information).

In some embodiments, system 100 may use model 102 for machine learning based outlier detection. Examples of model 102 may be found elsewhere in the present disclosure in, for example, FIGS. 2, 4A, and 4B, and relevant descriptions thereof. For example, model 102 may determine whether an event belongs to an outlier category. The outlier category may include events or activities that fall outside a range (e.g., an expected range of values, features, or probabilities for a data set). In some embodiments, the outlier category may include suspicious (including potentially or confirmed illegal or unusual) activities relating to an electronically accessible resource. Example electronically accessible resources may include a banking account, a credit card, confidential information, a stock trading platform, a commodity trading platform, an electronically record (e.g., an electronically record of inventories, transactions, personal information, credit histories, medical histories, criminal histories, employment histories, etc.). For example, a suspicious activity may include a fraudulent transaction, a bankruptcy risk, a money laundering activity, or unauthorized access to confidential information, or an event whose risk of being associated with fraud, an ongoing or upcoming bankruptcy, and/or money laundering, etc., exceeds a risk threshold. As another example, a suspicious activity may relate to or include an activity or occurrence in which a change or change over a period of time exceeds a threshold. Example suspicious activities of these or similar types include a change in a stock price within a period of time exceeding a threshold, a change in the trading volume of a stock within a period of time exceeding a threshold, a price of an item or a class of items (e.g., a good of interest, a commodity, raw oil, fuel, a precious metal, a rare-earth metal, a product of agriculture, a product of mining) that increases or drops to a threshold and/or a change thereof within a period of time exceeds a threshold, or the like, or a combination thereof. A regular category may include activities deemed to be within a normal range or exhibit a normal pattern or trend (e.g., no or low risk to the electronically accessible resource). Model 102 may use unsupervised learning and may train itself to simplify and/or speed up data processing while also enhancing model accuracy. In some embodiments, model 102 may train itself to generate better feature transformations at one or more nodes. A feature transformation may include a function that transforms features from one representation to another. In some embodiments, model 102 may train itself to generate better feature extraction at one or more nodes. Feature extraction is the process of extracting features from a data set to identify useful information. In some embodiments, model 102 may train itself to perform better exploratory data analysis at one or more nodes.

In a variety of embodiments, model 102 may update its configurations (e.g., weights, biases, or other parameters) based on the assessment of its prediction (e.g., outputs 106), reference feedback information (e.g., user indication of accuracy, reference labels, or other information), and/or availability of additional training data. In a variety of embodiments, system 100 may adjust parameters of model 102 to reconcile differences between the model's prediction and reference feedback. In this way, for example, system 100 may train model 102 to generate better predictions. In some embodiments, model 102 may be self-learning and trained, rather than explicitly programmed, and can perform significantly better in certain areas of problem-solving, as compared to traditional computer programs.

In some embodiments, the model (e.g., model 102) may automatically perform actions based on outputs 106. In some embodiments, the model (e.g., model 102) may not perform any actions. System 100 may use the output of the model (e.g., model 102) to generate a recommendation, notification, etc. More descriptions of outlier detection using model 102 may be found elsewhere in the present disclosure at, for example, FIGS. 2, 4A, 4B, and 6A-8, and relevant descriptions thereof.

System 100 may also include Application Programming Interface (API) layer 150. API layer 150 may allow the system to generate summaries across different devices. In some embodiments, API layer 150 may be implemented on mobile device 122 or user terminal 124. Alternatively, or additionally, API layer 150 may reside on one or more of cloud components 110. API layer 150 (which may be a Representational state transfer (REST) or web services API layer) may provide a decoupled interface to data and/or functionality of one or more applications. API layer 150 may provide a common, language-agnostic way of interacting with an application. Web services APIs offer a well-defined contract, called Web Services Description Language (WSDL), that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) Web services have traditionally been adopted in the enterprise for publishing internal services, as well as for exchanging information with partners in B2B transactions.

API layer 150 may use various architectural arrangements. For example, system 100 may be partially based on API layer 150, such that there is strong adoption of SOAP and RESTful web services, using resources like Service Repository and Developer Portal, but with low governance, standardization, and separation of concerns. Alternatively, system 100 may be fully based on API layer 150, such that separation of concerns between layers like API layer 150, services, and applications are in place.

In some embodiments, the system architecture may use a microservice approach. Such systems may use two types of layers: front-end layer and back-end layer, where microservices reside. In this kind of architecture, the role of the API layer 150 may provide integration between the front-end layer and back-end layer. In such cases, API layer 150 may use RESTful APIs (exposition to front-end or even communication between microservices). API layer 150 may use Advanced Message Queuing Protocol (AMQP) (e.g., Kafka, RabbitMQ, etc.). API layer 150 may use incipient usage of new communications protocols, such as gRPC, Thrift, etc.

In some embodiments, the system architecture may use an open API approach. In such cases, API layer 150 may use commercial or open source API platforms and their modules. API layer 150 may use a developer portal. API layer 150 may use strong security constraints applying web application firewall (WAF) and Distributed denial of service (DDoS) protections, and API layer 150 may use RESTful APIs as standard for external integration.

Figures 2, 3:
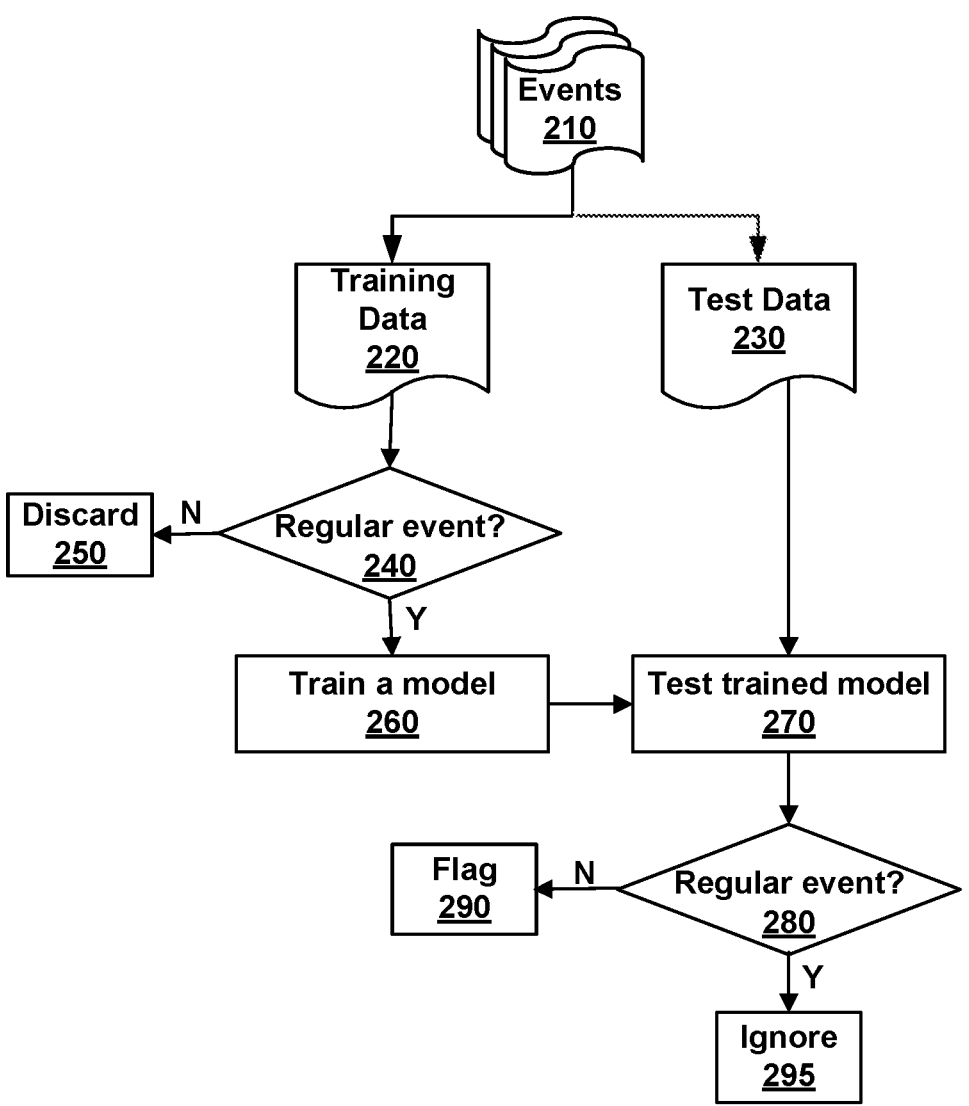
FIG. 2 illustrates an exemplary outlier detection model, in accordance with one or more embodiments.
FIG. 3 illustrates an exemplary confusion matrix, in accordance with one or more embodiments.

FIG. 2 illustrates an exemplary process for training and use of an outlier detection model, in accordance with one or more embodiments. The events 210 may include events retrieved from a fraudulent detection database. As used herein, an event may include a specific occurrence, incident, or situation that takes place within a particular time frame and context. Example events may include a transaction, an offer relating to a (tangible or intangible) product or service, an acceptance of an offer, a series of transactions/offers/acceptances/occurrences within a time period that share at least one common character (e.g., a series of transactions involving a same user, a same merchant, a same credit card, a same account (banking, email, etc.), a same buyer, a same seller, a same geographic location, a same stock, a same class of products, a same company, a same financial institute, or the like, or a combination thereof), one or more (successful or failed) attempts to access an electronically access-controlled resource, etc. An event data set of an event may include information defining or describing the event. As an example, with respect to a transaction of a product, an event data set may include information regarding the transaction, e.g., time, price, location, one or more parties involved, prior transactions involving the same parties or at least one of the parties, the quantity of the product involved, the method of payment, or the like, or a combination thereof. As another example, with respect to an attempt to access an electronically access-controlled resource, an event data set may include information regarding the attempt, e.g., time, location, one or more parties involved, the attempt count of unsuccessful attempts before the current attempt, authentication information provided, the access history (including time, locations, devices used, etc.) of the electronically access-controlled resource based on the same authentication information or not, or the like, or a combination thereof.

System 100 may split the events 210 (e.g., randomly) into two groups, one group, including training data 220, that system 100 may use to train a model, and the other group, including test data 230, that system 100 may use to test the model trained using the training data 220. The training data 220 may be screened at 240 to identify outlier events that belong to an outlier category. In some embodiments, the screening may be performed manually by one or more users. In some embodiments, the screening may be performed automatically based on event data sets associated with the events of the training data 220. For example, the event data set of an event of the training data 220 may include a predetermined identifier indicating whether the event is deemed a regular event or an outlier event, on the basis of which system 100 may perform the screening automatically. In some embodiments, system 100 may input an event of the training data 220 to a previously trained model to determine whether the event is a regular event or an outlier event. System 100 may discard the outlier events of the training data 220 at 250, and therefore not use it in training a model at 260, while system 100 may retain the regular events of the training data 220 for training a model for outlier detection at 260, to generate a trained model. System 100 may use the test data 230 to test the trained model at 270. If the trained model determines an event of test data 230 to be a regular event (or belong to a regular category) at 280, system 100 may ignore or omit the event from further processing (e.g., not assign to a recommended subset for further review) at 295. If the trained model determines an event of test data 230 to be an outlier event (or belong to an outlier category) at 280, system 100 may flag the event (e.g., assign to a recommended subset for further review) at 290. For example, the trained model may assign a value or identifier "1" to a regular event of test data 230, and a value or identifier of "−1" to an outlier event of the test data 230.

Merely by way of example, events 210 include 1,500 events, in which 1,485 events are regular events (or referred to as belonging to a regular category), and 15 events are outlier events (or referred to as belonging to an outlier category). Events 210 are split into two groups, one group including 1,000 events as training data 220 to be used for model training, and the other group including 500 events as test data 230 to be used for testing the trained model. Among the 1,000 events of the training data 220, 990 events are regular events and 10 are outlier events. The 10 outlier events are discarded and not used in the model training. The 990 regular events are used in training a model, for example, a one-class support vector machine (SVM), for outlier detection. Among the 500 events of the test data 230, 495 events are regular events, and 5 events are outlier events. When the model trained using the 990 regular events of the training data 220 is tested using the 500 events of the test data 230, rather than an accurate prediction of 495 regular events and 5 outlier events, the trained model determines that there are 97 outlier events, including 2 true outlier events (or true positives, or TP for brevity) and 95 false outlier events (or false positives or FP for brevity), and 403 regular events, including 400 true regular events (or true negatives or TN for brevity) and 3 false regular events (or false negatives or FN for brevity). The accurate prediction and the actual prediction may be shown in a confusion matrix as illustrated in FIG. 3. The accurate prediction of the trained model should be 495 TNs, 5 TPs, 0 FNs, and 0 FPs. The actual prediction of the trained model is 400 TNs, 2 TPs, 3 FNs, and 95 FPs. The high error rate of the trained model, for example, 95 false positives among the test data 230, including 500 events (or 19% error rate) in the example, may render the trained model unsuitable for practical application. For example, if the 2,000 events are credit card transactions, an identified outlier event may be a credit card transaction deemed fraudulent and therefore may incur an overhead cost associated with, for example, reissuing a credit card to replace an old credit card involved in the identified outlier event, writing off the transaction in the identified outlier event, or the like, or a combination thereof; an error rate of 19% in the outlier detection may incur an unacceptably high overhead cost and render the trained model unsuitable for practical use.

Figure 4A:
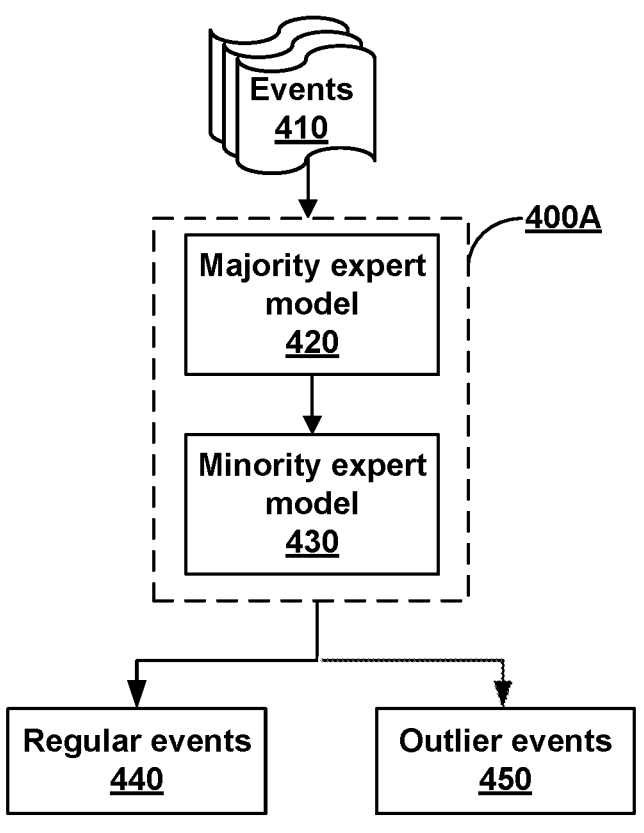
FIG. 4A illustrates an exemplary model architecture of a two-tier outlier detection model, in accordance with one or more embodiments.

These technical deficiencies may be overcome by outlier detection as illustrated in FIGS. 4A-8 of the present disclosure. FIG. 4A illustrates an exemplary model architecture of a two-tier outlier detection model 400A, in accordance with one or more embodiments. In some embodiments, model 400A may determine whether an event belongs to an outlier category or a regular category. One tier of two-tiered outlier detection model 400A may include a first machine learning model and a second machine learning model. One tier of model 400A, the first machine learning model, may include a majority expert model 420, and another tier of model 400A, the second machine learning model, may include a minority expert model 430. In some embodiments, one or both of majority expert model 420 and minority expert model 430 may be an unsupervised machine learning model. Merely by way of example, majority expert model 420 and minority expert model 430 each may be an unsupervised machine learning model. One or both of majority expert model 420 and minority expert model 430 may include a one-class SVM, an isolation forests model, a robust covariance model, a local outlier factor model, etc. In some embodiments, minority expert model 430 may include multiple component models each configured to determine a sub-category within the outlier category, thereby providing a multi-class output from the minority expert model as described elsewhere in the present disclosure.

System 100 may train majority expert model 420 using event data sets of sample regular events. Sample regular events may be prior events that are determined to belong to a regular category. For example, sample regular events of a regular category may include activities deemed to be no or low risk to the electronically access-controlled resource. The determination may be made manually by one or more users. The determination may be made automatically based on event data sets associated with the sample regular events. For example, the event data set of a sample regular event may include a predetermined identifier indicating whether the event is deemed a regular event or an outlier event, on the basis of which system 100 may make the determination automatically. In some embodiments, a sample regular event may be labeled to indicate that it is a regular event. In some embodiments, a sample regular event may have no label to indicate that it is a regular event. In some embodiments, system 100 may input a sample event to a previously trained model to determine whether the sample event is a regular event or an outlier event. In some embodiments, system 100 may train majority expert model 420 to predict whether an event belongs to a regular category that includes activities deemed to be no or low risk to an electronically access-controlled resource, or an outlier category that includes suspicious activities directed to the electronically access-controlled resource.

Figure 5:
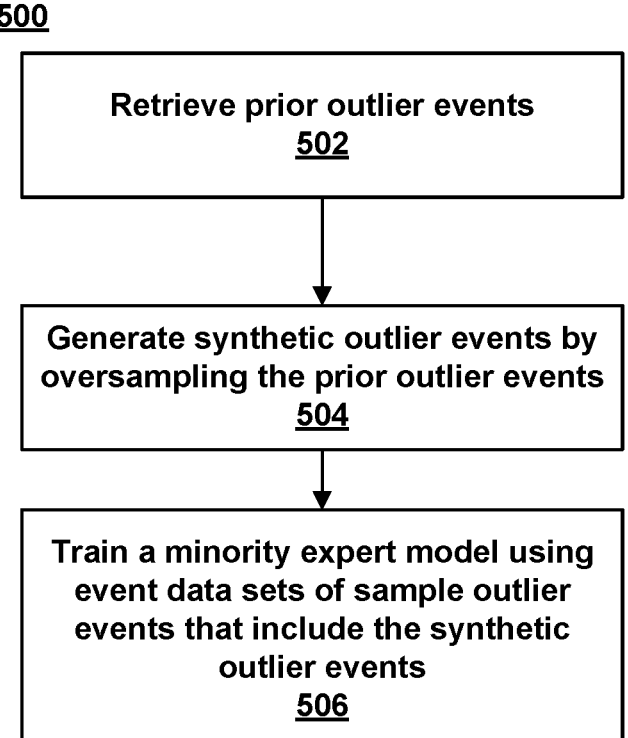
FIG. 5 illustrates a flowchart of the process for training a minority expert model, in accordance with one or more embodiments.

System 100 may train minority expert model 430 using event data sets of sample outlier events. In some embodiments, a sample outlier event may be labeled to indicate that it is an outlier event. In some embodiments, a sample outlier event may have no label to indicate that it is an outlier event. Sample outlier events may be prior events that are determined to belong to an outlier category. For example, sample outlier events of an outlier category may include suspicious activities directed to an electronically access-controlled resource. In some embodiments, sample outlier events may include synthetic outlier events system 100 generated by oversampling prior outlier events based on an oversampling algorithm. See, for example, process 500 as illustrated in FIG. 5, and relevant descriptions thereof. In some embodiments, system 100 may train majority expert model 420 and minority expert model 430 on balanced training data. For example, system 100 may use a first count of the sample regular events to train majority expert model 420, and a second count of the sample outlier events to train minority expert model 430, in which a ratio of the first count to the second count may be below 10, 5, or 2. Merely by way of example, the ratio of the first count to the second count may be 1. In some embodiments, system 100 may train minority expert model 430 to determine whether an event belongs to a regular category that includes activities deemed to be no or low risk to an electronically access-controlled resource, or an outlier category that includes suspicious activities directed to the electronically access-controlled resource.

Referring back to the example described in FIG. 2, in which training data 220 includes 1,000 events, 990 regular events and 10 outlier events, system 100 may use the 990 regular events of training data 220 to train majority expert model 420, and the 10 outlier events of training data 220 to train minority expert model 430. For the training of minority expert model 430, system 100 may generate synthetic outlier events by oversampling the 10 outlier events of training data 220 that have actually occurred. For example, system 100 may train minority expert model 430 using 990 outlier events, including the 10 outlier events that have actually occurred and 980 synthetic outlier events system 100 generates. Thus, system 100 may train majority expert model 420 and minority expert model 430 on balanced training data so that the quality of model 400A may improve with respect to, for example, accuracy and/or efficiency of model 400A in outlier detection.

Model 400A may analyze events 410 to determine if any one of events 410 is an outlier event belonging to the outlier category. Events 410 may include a plurality of events. In some embodiments, at least a portion of the plurality of events include time-series events (or referred to as subsequence-based events) that have occurred or been provided to model 400A sequentially. In some embodiments, events 410 may be provided to model 400A in a cross-sectional/tabular form. If event 410 is determined to belong to the outlier category by model 400A, or a portion thereof (e.g., majority expert model 420, minority expert model 430), system 100 may flag event 410 for further processing or review. For example, system 100 may first input an event data set of an event 410 to majority expert model 420 of model 400A to predict whether the event 410 may belong to the outlier category. A first output from majority expert model 420 may predict that event 410 is an outlier event belonging to the outlier category or a regular event belonging to a regular category. In response to the first output predicting that event 410 may belong to the outlier category (e.g., event 410 being flagged by majority expert model 420), system 100 may input the event data set of event 410 to minority expert model 430 of model 400A. A second output from minority expert model 430 may confirm that event 410 belongs to the outlier category (e.g., minority expert model 430 flagging event 410) or indicate that event 410 belongs to the regular category (e.g., minority expert model 430 unflagging event 410 that majority expert model 420 originally flagged). Model 400A may process each of a plurality of events 410 and classify or categorize each of events 410 as a regular event 440 (or belonging to a regular category) or an outlier event 450 (or belonging to an outlier category) as an output.

Figure 4B:
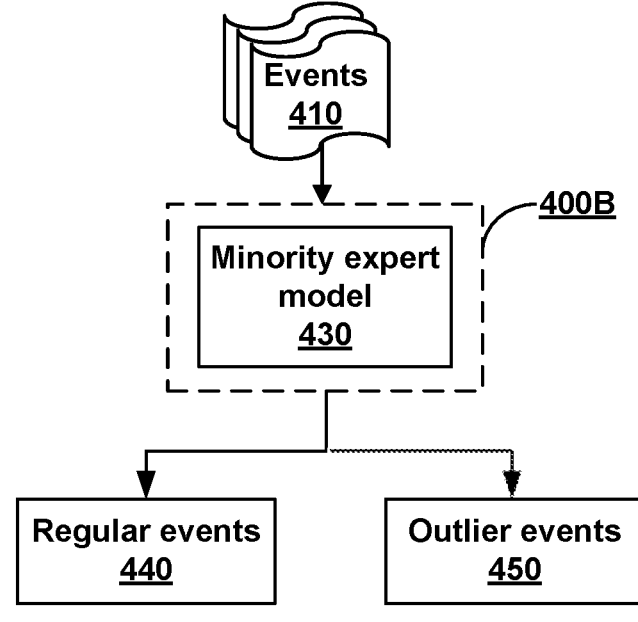
FIG. 4B illustrates an exemplary model architecture of a single-tier outlier detection model, in accordance with one or more embodiments.

FIG. 4B illustrates an exemplary model architecture of a single-tier outlier detection model 400B, in accordance with one or more embodiments. In some embodiments, model 400B may determine whether any event of events 410 is a regular event 440 (or belonging to a regular category) or an outlier event 450 (or belonging to an outlier category) as an output using only a minority expert model 430. Events 410 may include a plurality of events. In some embodiments, at least a portion of the plurality of events include time-series events (or referred to as subsequence-based events) that have occurred or been provided to model 400B sequentially. In some embodiments, events 410 may be provided to model 400B in a cross-sectional/tabular form. Except that the input of minority expert model 430 of model 400B includes an event data set that has not been processed by a majority expert model, the structure, training, application, and/or output of minority expert model 430 of model 400B may be similar to minority expert model 430 of model 400A, the description of which is not repeated here.

In some embodiments, minority expert model 430 may include multiple component models each configured to determine a sub-category within the outlier category, thereby providing a multi-class output from minority expert model 430 as described elsewhere in the present disclosure.

Merely by way of example, minority expert model 430 may be trained to detect an outlier event regarding trading of a stock; minority expert model 430 may include a feature extraction component model configured to extract features relating to various aspects of the stock, a price trend component model configured to detect an outlier event in terms of the price of the stock, or a change in the stock price over time, a trading volume component model configured to detect an outlier event in terms of the trading volume of the stock, or a change in the trading volume over time, an insider trading monitoring component model configured to detect an outlier event in terms of an insider trading of the stock; accordingly, minority expert model 430 may generate a multi-class output based on an event data set of an event categorizing the event in multiple aspects.

As another example, minority expert model 430 may be trained to detect an outlier event regarding trading and the inventory of a commodity; minority expert model 430 may include a feature extraction component model configured to extract features relating to various aspects of the commodity, a price trend component model configured to detect an outlier event in terms of the price of the commodity, or a change in the price over time, a trading volume component model configured to detect an outlier event in terms of the trading volume of the commodity, or a change in the trading volume over time, an inventory monitoring component model configured to detect an inventory of the commodity; accordingly, minority expert model 430 may generate a multi-class output based on an event data set of an event categorizing the event in multiple aspects.

FIG. 5 illustrates a flowchart of the process for training a minority expert model, in accordance with one or more embodiments. For example, process 500 may represent steps taken by one or more components of system 100 as shown in FIG. 1, or by one or more device external to system 100. Merely by way of example, a third-party device may train, maintain, and/or update a minority expert model (e.g., minority expert model 430 as illustrated in FIG. 4A and FIG. 4B) and transmit a trained or updated minority expert model to system 100 and system 100 may store the trained or updated minority expert model as part of, for example, model 102. As another example, system 100 may train, maintain, and/or update a minority expert model (e.g., minority expert model 430 as illustrated in FIG. 4A and FIG. 4B) and store the trained or updated minority expert model as part of, for example, model 102.

At step 502, process 500 may retrieve (e.g., using control circuitry of one or more components of system 100 (FIG. 1)) prior outlier events. The prior outlier events may include one-dimensional or multi-dimensional features that a minority expert model can extract and/or learn to perform outlier detection. System 100 may retrieve the prior outlier events from a storage device of system 100, a third party, etc. For example, the prior outlier events may include prior credit card transactions that have been determined to be fraudulent, prior access to confidential information that has been determined to be illegal, etc. The prior outlier events may have occurred at a financial institution, at a merchant, within a network of merchants, etc. A prior outlier event may be one detected by a machine learning model (e.g., majority expert model 420, minority expert model 430, model 400A, model 400B, model 102) or by a user.

At step 504, process 500 may generate (e.g., using control circuitry of one or more components of system 100 (FIG. 1)) synthetic outlier events by oversampling the prior outlier events. System 100, by oversampling the prior outlier events, may generate synthetic outlier events that mimic the prior outlier events. Using synthetic outlier events in the training of the minority expert model may alleviate or solve the problem of scarcity of sample outlier events, and/or reduce the cost and/or time for collecting or accumulating sample outlier events that system 100 can use in training and/or updating the minority expert model. System 100 may perform the oversampling based on an oversampling algorithm. Examples of the oversampling algorithm include random oversampling, synthetic minority oversampling technique (SMOTE), borderline-SMOTE, borderline oversampling with SVM, adaptive synthetic sampling (ADASYN), etc. System 100 may determine parameters of the oversampling algorithm based on the extent of oversampling (e.g., 5-fold oversampling, 10-fold oversampling), a difference between a prior outlier event and a prior regular event, dispersion of newly generated synthetic outlier events, or the like, or a combination thereof.

At step 506, process 500 may train (e.g., using control circuitry of one or more components of system 100 (FIG. 1)) a minority expert model using event data sets of sample outlier events that include the synthetic outlier events. The minority expert model may be an unsupervised machine learning model. For example, the minority expert model may include a one-class SVM model, an isolation forests model, a robust covariance model, a local outlier factor model, or a clustering model. System 100 may train the minority expert model on training data that includes synthetic outlier events, thereby alleviating the extremely imbalanced outlier detection problem featuring a disproportionately low percentage (e.g., less than roughly 1%) of a population of events representing the outlier sub-population (or minority sub-population), which in turn may improve the minority expert model so trained and the two-tier outlier detection model (e.g., model 400A) or single-tier outlier detection model (e.g., model 400B) that includes the minority expert model.

In some embodiments, the minority expert model may include multiple component models each configured to determine a sub-category within the outlier category, thereby providing a multi-class output from the minority expert model as described elsewhere in the present disclosure. In some embodiments, each of the component models may be trained using training samples including one or more synthetic data sets. The one or more synthetic data sets may be generated based on prior outlier event(s) as described in 504. In some embodiments, system 100 may generate the one or more synthetic data sets to be used for training a component model corresponding to an outlier sub-category by oversampling at least one prior outlier event deemed to belong to that outlier sub-category.

In some embodiments, the minority expert model may include a feature extract component model trained to extract features from an event data set of an event input to the minority model. For instance, the feature extract component model may be trained to extract various features relating to different sub-categories of the outlier category. Such extracted features may be input to each of various specialty component models, respectively; and these specialty component models trained to analyze respective features specific to a sub-category may analyze the feature(s) input thereto to determine whether the event belongs to that sub-category.

In some embodiments, at least two of the component models of the minority expert model may be in serial configuration such that input data to the minority expert model flows through various component models one by one. In some embodiments, at least two of the component models of the minority expert model may be in parallel configuration such that input data to the minority expert model flows through various component models in parallel. In some embodiments, a portion of the component models of the minority expert model may be in parallel configuration, and a portion of the component models of the minority expert model may be in serial configuration. Merely by way of example, the minority expert model may include a feature extraction component model in serial connection with a group of specialty component models that are in parallel configuration; an event data set of an event input to the minority expert model is input to the feature extraction component model where features relating to different sub-categories of the outlier category are extracted, and the extracted feature(s) relating to each of the sub-categories are/is input to the corresponding specialty component model in parallel so that the sub-categorization may be determined in parallel, thereby improving processing efficiency.

Figure 6A:
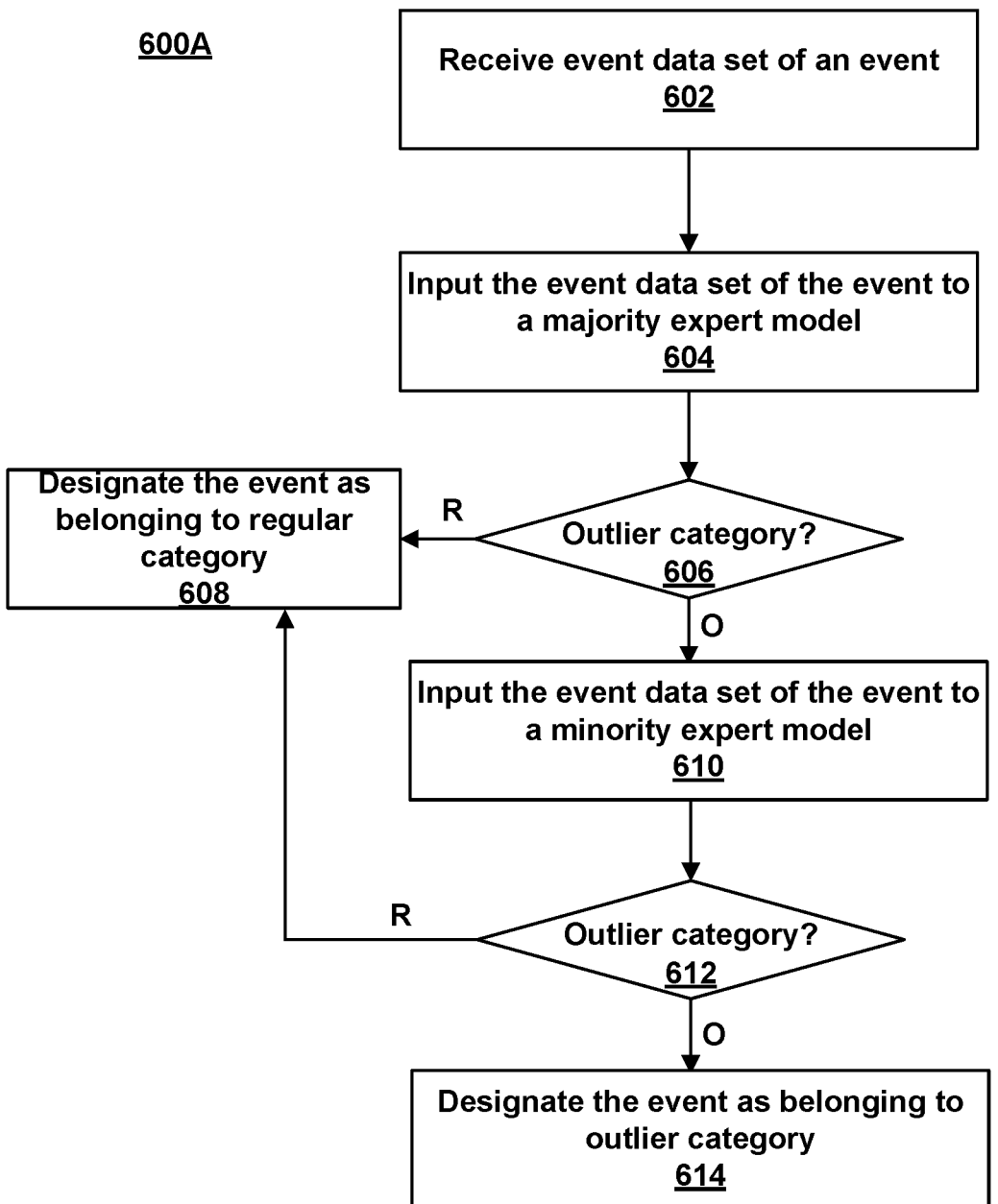
FIG. 6A illustrates a flowchart of the process for performing two-tier outlier detection, in accordance with one or more embodiments.

FIG. 6A illustrates a flowchart of the process for performing two-tier outlier detection, in accordance with one or more embodiments. For example, process 600A may represent the steps taken by one or more devices as shown in FIG. 1 when performing outlier detection. Process 600A may employ a two-tier outlier detection model (e.g., model 102 in FIG. 1, model 400A in FIG. 4A) for performing the two-tier outlier detection.

At step 602, process 600A may receive (e.g., using control circuitry of one or more components of system 100 (FIG. 1)) an event data set of an event. The event data set of the event may include, for example, the time when the event occurred, the location where the event occurred (e.g., physical address, Internet Protocol (IP) address, etc.), an entity (e.g., a merchant) in relation to which the event occurred, the amount of the fund involved in the event, an actor in relation to which the event occurred, or the like, authentication information (e.g., login information, user name, password, authentication code, answer to a secret question, pin, etc.) provided, or a combination thereof. System 100 may convert the event data set to a one-dimensional or multi-dimensional feature vector.

At step 604, process 600A may input (e.g., using control circuitry of one or more components of system 100 (FIG. 1)) the event data set of the event (e.g., in the form of the one-dimensional or multi-dimensional features vector) to a first machine learning model. In some embodiments, system 100 may use majority expert model 420 trained on sample regular events as the first machine learning model. The first output of the first machine learning model may predict whether the event belongs to the outlier category. In response to the first output predicting that the event does not belong to the outlier category at 606 (denoted by the arrow "R" from 606, which may stand for "regular" or not an outlier), at step 608, process 600A designates (e.g., using control circuitry of one or more components of system 100 (FIG. 1)) the event as belonging to the regular category at 608. For example, majority expert model 420 may flag the event for further evaluation using a second machine learning model. As another example, process 600A may consider it unnecessary to analyze the event further.

In response to the first output predicting that the event belongs to the outlier category at 606 (denoted by the arrow "O" from 606, which may stand for "outlier" or not regular), at step 610, process 600A inputs (e.g., using control circuitry of one or more components of system 100 (FIG. 1)) the event data set of the event to the second machine learning model. In some embodiments, system 100 may use minority expert model 430 trained on sample outlier events, including synthetic outlier events, as the second machine learning model. The second output of the second machine learning model may indicate whether the event belongs to the outlier category. If the second output indicates that the event belongs to the outlier category at 612 (denoted by the arrow "O" from 612), process 600A designates (e.g., using control circuitry of one or more components of system 100 (FIG. 1)) the event as belonging to the outlier category at 614. If the second output indicates that the event does not belong to the outlier category at 612 (denoted by the arrow "R" from 612), process 600A designates (e.g., using control circuitry of one or more components of system 100 (FIG. 1)) the event as belonging to the regular category at 608. For instance, the second output may include an identifier for output, in which the identifier may indicate the categorization of the event, for example, whether the event belongs to the outlier category or the regular category.

In some embodiments, system 100 may perform process 600A on a plurality of events (e.g., events 410 as described in FIG. 4A). For example, the plurality of events may include a second event. Process 600A may further include retrieving (e.g., using control circuitry of one or more components of system 100 (FIG. 1)) a second event data set of the second event, inputting, using the control circuitry, the second event data set of the second event to the first machine learning model; and receiving, from the first machine learning model, a first output of the second event predicting whether the second event belongs to the outlier category. In response to the first output predicting that the second event does not belong to the outlier category, process 600A may include not inputting the second event data set of the second event to the second machine learning model. In response to the first output predicting that the second event belongs to the outlier category, process 600A may include inputting the second event data set of the second event to the second machine learning model to obtain a second output of the second event.

For each of the plurality of events, system 100 may perform process 600A to generate a first output and/or a second output. The first output and/or the second output of an event may include an identifier indicating whether the event is determined to belong to the outlier category or regular category. Based on the first outputs and/or second outputs of the plurality of events, system 100 may generate a recommended subset among the plurality of events for output. In some embodiments, the recommended subset may include events that both the first machine learning model (e.g., majority expert model 420) and the second machine learning model (e.g., minority expert model 430) determine to belong to the outlier category. A user may review the recommended subset and select or designate the categorization of an event of the recommended subset as belonging to the outlier category or regular category. For example, the user may confirm or modify the identifier of an event of the recommended subset.

In some embodiments, based on the first output and/or the second output of each event of the plurality of events, a user selection or designation of the categorization of each event of the plurality of events (if available), system 100 may generate a confusion matrix as illustrated in FIG. 3. For example, system 100 may designate events of the plurality of respective events that both the first machine learning model and the second machine learning model determine to belong to the outlier category as TPs, and count the TPs to obtain a first count; system 100 may designate events of the plurality of respective events that the first machine learning model determines to belong to the outlier category but the second machine learning model determines to belong to the regular category (i.e. not belonging to the outlier category) as FPs, and count the FPs to obtain a second count; system 100 may designate events of the plurality of respective events that the first machine learning model determines to belong to the regular category (i.e. not belonging to the outlier category) as TNs, and count the TNs to obtain a third count; system 100 may generate a confusion matrix based on the first count, the second count, and the third count. In some embodiments, system 100 may deem the count of FNs in the confusion matrix to be zero. As another example, system 100 may take into consideration a user selection or designation of the categorization of each event of the plurality of events (if available) in the generation of the confusion matrix. For instance, when a user selection or designation of the categorization of an event of the plurality of events is available, system 100 may overwrite the first output and the second output with respect to the event with the user selection or designation. Thus, for an event of the plurality of respective events that both the first machine learning model and the second machine learning model determine to belong to the outlier category, if a user designates the event as a regular event, system 100 may designate the event as an FP in the confusion matrix.

Merely by way of example, a comparison outlier detection on a batch of 94,936 events was made between (1) using a trained model as illustrated in FIG. 2, and (2) following process 600A as illustrated in FIG. 6A using model 400A as illustrated in FIG. 4A. The categorization of each event of the batch are known. Using the trained model as illustrated in FIG. 2, the following confusion matrix was generated: 112 TPs, 24,187 FPs, 10 FNs, and 70,627 TNs. Following process 600A as illustrated in FIG. 6A using model 400A as illustrated in FIG. 4A, the following confusion matrix was generated: 89 TPs, 29 FPs, 33 FNs, and 94,785 TNs.

In some embodiments, the minority expert model may include multiple component models each configured to determine a sub-category within the outlier category, thereby providing a multi-class output from the minority expert model as described elsewhere in the present disclosure.

Figure 6B:
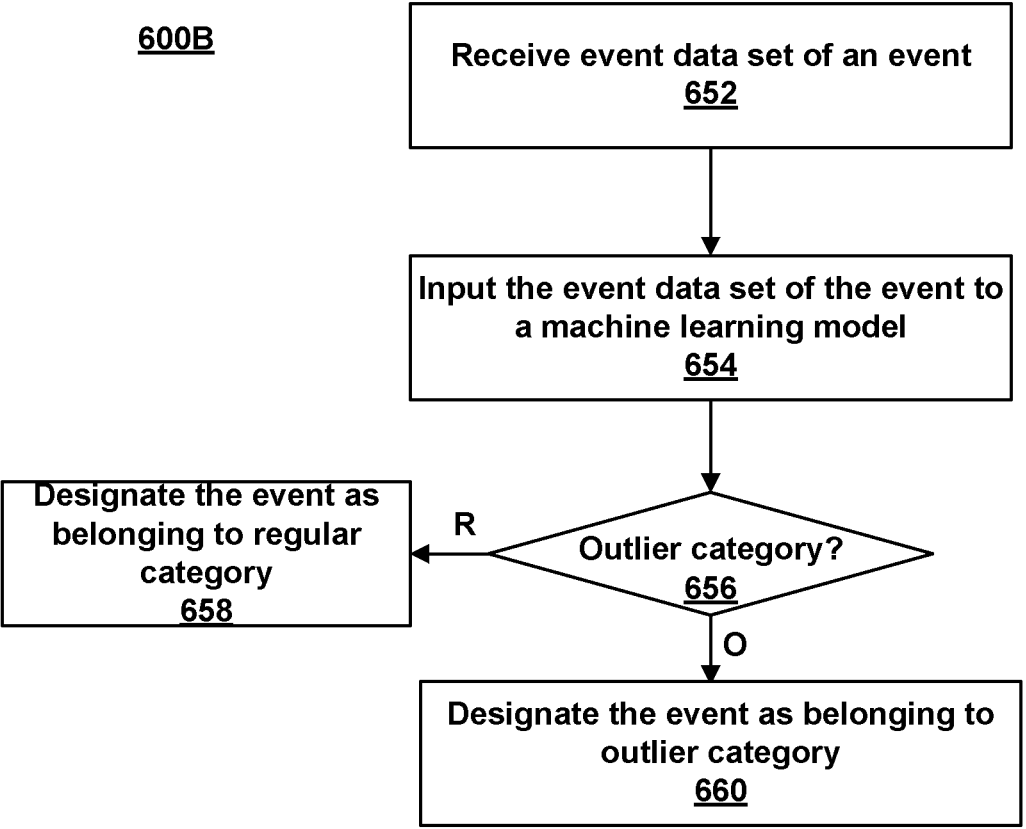
FIG. 6B illustrates a flowchart of the process for performing single-tier outlier detection, in accordance with one or more embodiments.

FIG. 6B illustrates a flowchart of the process for performing single-tier outlier detection, in accordance with one or more embodiments. For example, process 600B may represent the steps taken by one or more devices as shown in FIG. 1 when performing outlier detection. Process 600B may employ a single-tier outlier detection model involving only a machine learning model. In some embodiments, the machine learning model may be a minority expert model (e.g., model 102 in FIG. 1, model 400B in FIG. 4B) for performing the single-tier outlier detection. The single-tier outlier detection may omit the use of a majority expert model (e.g., majority expert model 420 of model 400A in FIG. 4A), and therefore simplify the outlier detection. In some embodiments, the machine learning model involved in process 600B may be obtained by unsupervised machine learning on oversampled training data.

At step 652, process 600B may receive (e.g., using control circuitry of one or more components of system 100 (FIG. 1))

an event data set of an event, similar to that as described in 602 of process 600A, which is not repeated here.

At step 654, process 600B ma input (e.g., using control circuitry of one or more components of system 100 (FIG. 1)) the event data set of the event to the machine learning model. In some embodiments, system 100 may use minority expert model 430 trained on sample outlier events, including synthetic outlier events, as the machine learning model. The output of the machine learning model may indicate whether the event belongs to the outlier category. If the output indicates that the event belongs to the outlier category at 656 (denoted by the arrow "O" from 656), process 600B designates (e.g., using control circuitry of one or more components of system 100 (FIG. 1)) the event as belonging to the outlier category at 660. If the output indicates that the event does not belong to the outlier category at 656 (denoted by the arrow "R" from 656), process 600B designates (e.g., using control circuitry of one or more components of system 100 (FIG. 1)) the event as belonging to the regular category at 658. For instance, the output may include an identifier for output, in which the identifier may indicate the categorization of the event, for example, whether the event belongs to the outlier category or the regular category.

In some embodiments, system 100 may perform process 600B on a plurality of events (e.g., events 410 as described in FIG. 4B). For example, the plurality of events may include a second event. Process 600B may further include retrieving (e.g., using control circuitry of one or more components of system 100 (FIG. 1)) a second event data set of the second event, inputting, using the control circuitry, the second event data set of the second event to the machine learning model; and receiving, from the machine learning model, an output corresponding to the second event predicting whether the second event belongs to the outlier category.

For each of the plurality of events, system 100 may perform process 600B to generate an output. The output of an event may include an identifier indicating whether the event is determined to belong to the outlier category or regular category. Based on the outputs of the plurality of events, system 100 may generate a recommended subset among the plurality of events for output. In some embodiments, the recommended subset may include events that the machine learning model (e.g., minority expert model 430) determines to belong to the outlier category. A user may review the recommended subset and select or designate the categorization of an event of the recommended subset as belonging to the outlier category or regular category. For example, the user may confirm or modify the identifier of an event of the recommended subset.

In some embodiments, based on the output of each event of the plurality of events, a user selection or designation of the categorization of each event of the plurality of events (if available), system 100 may generate a confusion matrix as illustrated in FIG. 3. For example, system 100 may designate events of the plurality of respective events that the minority expert model determines to belong to the outlier category as TPs, and count the TPs to obtain a first count; system 100 may designate events of the plurality of respective events that the minority expert model determines to belong to the regular category (i.e., not belonging to the outlier category) as TNs, and count the TNs to obtain a third count. As another example, system 100 may take into consideration a user selection or designation of the categorization of each event of the plurality of events (if available) in the generation of the confusion matrix. For example, when a user selection or designation of the categorization of an event of the plurality of events is available, system 100 may overwrite the output of the minority expert model with respect to the event with the user selection or designation. Thus, for an event of the plurality of respective events that the minority expert model determines to belong to the outlier category, if a user designates the event as a regular event, system 100 may designate the event as an FP in the confusion matrix, and count FPs to obtain a second count. System 100 may generate a confusion matrix based on the first count, the second count, and the third count. In some embodiments, system 100 may deem the count of FNs in the confusion matrix to be zero.

In some embodiments, the machine learning model for outlier detection (e.g., minority expert model 430) involved in process 600A or process 600B may include multiple component models each configured to determine a sub-category within the outlier category, thereby providing a multi-class output from the machine learning model as described elsewhere in the present disclosure. The multi-class result corresponding to an event may indicate to which one or more sub-categories of the plurality of sub-categories of the outlier category the event belongs. System 100 may provide the multi-class result for each of one or more events for output from process 600A or process 600B. Process 600A or process 600B may include further operations based on such results. For instance, system 100 may select, from a plurality of candidate reactions, a reaction to be perform based on the multi-class result of an event, and perform the selected reaction. In some embodiments, different outlier sub-categories may correspond to different candidate reactions. In some embodiments, different combinations of two or more sub-categories may correspond to different candidate reactions. Example candidate reactions may include generating a notification or recommendation based on the result, suspending an access to an electronically accessible resource (e.g., an electronically access-controlled resource), transmitting an authentication request to a user, initiating or suspending a transaction, or the like, or a combination thereof.

Merely by way of example, when system 100 determines an event regarding a stock to belong to an outlier category, and further determines that the event belongs to a sub-category of stock trading by an insider, system 100 may generate a notification and transmit the notification to one or more user devices. The notification may be in the form of a text message, an audio message, a written report, or the like, or a combination thereof.

As another example, when system 100 determines an event regarding a stock to belong to an outlier category, and further determines that the event belongs to a sub-category of stock price falling below a stock price threshold and simultaneously a sub-category of trading volume of the stock exceeding a volume threshold, system 100 may generate a recommendation for a buy order of the stock and transmit the recommendation to a user device.

In some embodiments, system 100 may assess performance of the machine learning model(s) for outlier detection (e.g., majority expert model 420, minority expert model 430, model 102, model 400B, model 400B) involved in process 600A or process 600B. For instance, system 100 may performance of the machine learning model(s) based on a percentage of false positives out of the events the machine learning model(s) have processed. System 100 may determine such a percentage based on a confusion matrix corresponding to the events the machine learning model(s) have processed, a ratio of the count of false positives (based on user input or determined by system 100 as described elsewhere in the present disclosure) to a total count of the events the machine learning model(s) have processed, a ratio of the count of false positives (based on user input or determined by system 100 as described elsewhere in the present disclosure) to a count of the events the machine learning model(s) deem to belong to the outlier category, etc. In some embodiments, system 100 may generate, for output, a report regarding the performance of the machine learning model.

In some embodiments, system 100 may update the machine learning model(s) based on the performance assessment. For instance, if system 100 determines that the performance of the machine learning model(s) is below a threshold, system 100 may update the machine learning model(s). In some embodiments, system 100 may obtain training data for updating the machine learning model(s) (e.g., minority expert model 430) by, e.g., further oversampling sample events (e.g., sample outlier events) already used in prior model training or updating, or oversampling newly acquired sample events (e.g., sample outlier events), or a combination thereof.

FIG. 7 illustrates a flowchart of the process for user interaction directed to an outlier event, in accordance with one or more embodiments. For example, process 700 may represent the steps taken by one or more devices as shown in FIG. 1 when a plurality of events are analyzed in terms of their respective outlier/regular categorization. In some embodiments, system 100 may combine process 700 with one or more steps of process 600A (FIG. 6A) or process 600B (FIG. 6B). For example, system 100 may perform process 700 after system 100 has analyzed a plurality of events in terms of their respective outlier/regular categorization according to process 600A or 600B.

For an event that system 100 determines to belong to the outlier category using the outlier detection method (e.g., according to process 600A or 600B), system 100 may assign an identifier to the event indicating so. At step 702, process 700 generates (e.g., using control circuitry of one or more components of system 100 (FIG. 1)) for output, on a user interface, a recommendation to a user that the event is further reviewed. System 100 may generate, for output on the user interface, a prompt inviting the user to review the event. In some embodiments, the user interface may be implemented on the mobile device 122 or user terminal 124. In some embodiments, process 700 provides (e.g., using control circuitry of one or more components of system 100 (FIG. 1)) for output, on the user interface, the event data set of the event or an access (e.g., a clickable link) to the event data set to facilitate the user review of the event. For example, system 100 may generate, for output on the user interface, a presentation of the event data set, or a portion thereof. As another example, system 100 may generate, for output on the user interface, a hyperlink to the event data set or an icon representing a folder enclosing the event data set so that the user can click on the hyperlink or the icon to view, on the user interface, the event data set, or a portion thereof. As a further example, system 100 may generate, for output on the user interface, a hyperlink to the event data set or an icon representing a folder enclosing the event data set that triggers electronic transmission of the event data set to a designation (e.g., another user device, an email account, or a printer) so that the user can click on the hyperlink or the icon to trigger the data transmission.

At step 704, process 700 may generate (e.g., using control circuitry of one or more components of system 100 (FIG. 1)) for output, on the user interface, options for the user to select from. The options may include at least one of confirming the identifier or modifying the identifier. For example, system 100 may generate, for output on the user interface, an icon corresponding to the option of confirming the identifier and an icon corresponding to the option of modifying the identifier. A user may select an option by clicking on either one of the icons.

At step 706, process 700 may receive (e.g., using control circuitry of one or more components of system 100 (FIG. 1)), via the user interface, a user selection of one of the options. The user selection may indicate whether the user confirms or modifies the identifier of the event. That is, the user selection may indicate whether the user confirms or modifies the categorization of the event determined using the two-tier outlier detection method (e.g., according to process 600A or 600B). For example, system 100 may receive a user selection when the user clicks on either one of two icons on the user interface, in which one of the two icons may correspond to the option of confirming the identifier and the other one of the two icons corresponds to the option of modifying the identifier.

At step 708, process 700 may generate (e.g., using control circuitry of one or more components of system 100 (FIG. 1)) for output, on the user interface, the confirmed or modified categorization (e.g., by way of showing the confirmed or modified identifier) of the event.

Figure 8:
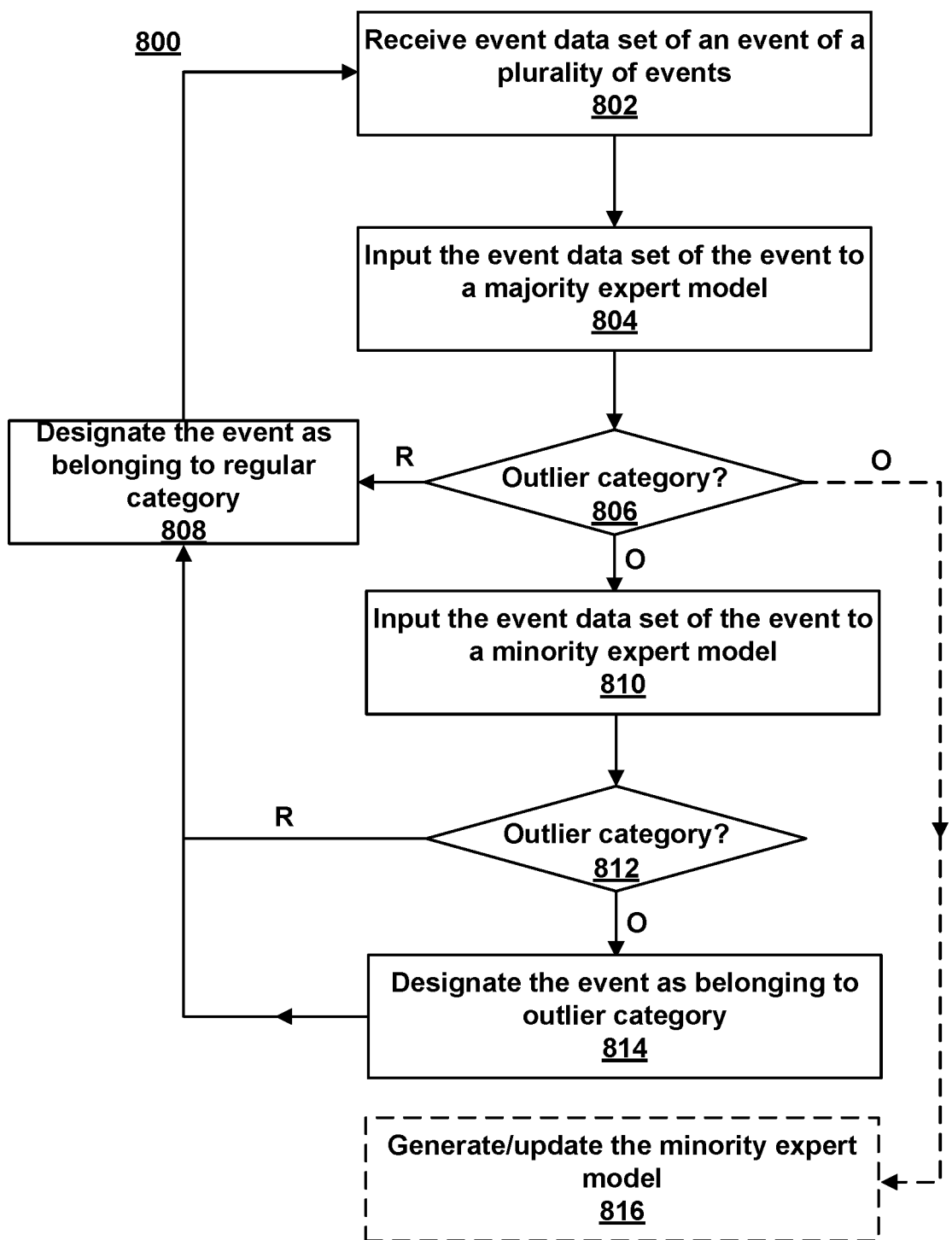
FIG. 8 illustrates a flowchart of the process for performing outlier detection on time-series events, in accordance with one or more embodiments.

FIG. 8 illustrates a flowchart of the process for performing outlier detection on time-series events, in accordance with one or more embodiments. For example, process 800 may represent the steps taken by one or more devices as shown in FIG. 1 when performing outlier detection. Process 800 may employ a multi-tier outlier detection model (e.g., model 102 in FIG. 1, model 400A in FIG. 4A, model 400B in FIG. 4B) for performing the outlier detection.

At step 802, process 800 may receive (e.g., using control circuitry of one or more components of system 100 (FIG. 1)) an event data set of an event from a plurality of events (e.g., events 410 as described in FIG. 4A and FIG. 4B). The event data set of the event may include, for example, the time when the event occurred, the location where the event occurred (e.g., physical address, Internet Protocol (IP) address, etc.), an entity (e.g., a merchant) in relation to which the event occurred, the amount of the fund involved in the event, an actor in relation to which the event occurred, or the like, authentication information (e.g., login information, user name, password, authentication code, answer to a secret question, pin, etc.) provided, or a combination thereof. System 100 may convert the event data set to a one-dimensional or multi-dimensional feature vector.

At step 804, process 800 may input (e.g., using control circuitry of one or more components of system 100 (FIG. 1)) the event data set of the event (e.g., in the form of the one-dimensional or multi-dimensional features vector) to a first machine learning model. In some embodiments, system 100 may use majority expert model 420 trained on sample regular events as the first machine learning model. The first output of the first machine learning model may predict whether the event belongs to the outlier category. In response to the first output predicting that the event does not belong to the outlier category at 806 (denoted by the arrow "R" from 806), at step 808, process 800 may designate (e.g., using control circuitry of one or more components of system 100 (FIG. 1)) the event as belonging to the regular category at 808. Process 800 can return to step 802 to retrieve a next event for analysis through 804 and 808. Process 800 may proceed with the iterations of 802-808 retrieving and analyzing event data sets of the plurality of events using only majority expert model 420 if majority expert model 420 determines that all these events that have been analyzed belong to the regular category. Considering that there are usually many more regular events, system 100 may encounter a string of regular events and need to involve only majority expert model 420 in analyzing these events, thereby obviating the need to involve minority expert model 430 which in turn may simplify the analysis and system resources employed in the analysis.

In response to the first output predicting that an event belongs to the outlier category at 806 (denoted by the arrow "O" from 806), at step 810, process 800 may input (e.g., using control circuitry of one or more components of system 100 (FIG. 1)) the event data set of the event to a second machine learning model. In some embodiments, system 100 may use minority expert model 430 trained on sample outlier events, including synthetic outlier events, as the second machine learning model. The second output of the second machine learning model may indicate whether the event belongs to the outlier category. If the second output indicates that the event belongs to the outlier category at 812 (denoted by the arrow "O" from 812), process 800 may designate (e.g., using control circuitry of one or more components of system 100 (FIG. 1)) the event as belonging to the outlier category at 814.

If the second output indicates that the event does not belong to the outlier category at 812 (denoted by the arrow "R" from 812), process 800 may designate (e.g., using control circuitry of one or more components of system 100 (FIG. 1)) the event as belonging to the regular category at 808. For instance, the second output may include an identifier for output, in which the identifier may indicate the categorization of the event, for example, whether the event belongs to the outlier category or the regular category. Then process 800 may proceed further to 802 to retrieve an event data set of a further event of the plurality of events for analysis.

For each of the plurality of events, system 100 may perform process 800 to generate a first output and/or a second output. The first output and/or the second output of an event may include an identifier indicating whether the event is determined to belong to the outlier category or regular category. Based on the first outputs and/or second outputs of the plurality of events, system 100 may generate a recommended subset among the plurality of events for output. In some embodiments, the recommended subset may include events that both the first machine learning model (e.g., majority expert model 420) and the second machine learning model (e.g., minority expert model 430) determine to belong to the outlier category. A user may review the recommended subset and select or designate the categorization of an event of the recommended subset as belonging to the outlier category or regular category. For example, the user may confirm or modify the identifier of an event of the recommended subset.

In some embodiments, based on the first output and/or the second output of each event of the plurality of events, a user selection or designation of the categorization of each event of the plurality of events (if available), system 100 may generate a confusion matrix as illustrated in FIG. 3 as described elsewhere in the present disclosure. See, e.g., FIGS. 4A and 6A, and relevant description thereof, which is not repeated here.

Additional or alternatively, in response to the first output predicting that an event belongs to the outlier category at 806 (denoted by the arrow "O" from 806), at step 816, process 800 may generate or update minority expert model 430 based on the event determined to be an outlier event belonging to the outlier category. In some embodiments, system 100 may expand, based on an oversampling algorithm, the detected outlier event to generate one or more synthetic outlier events as described in 504. The one or more synthetic events may be used as sample outlier events to generate a minority expert model if no prior minority expert model exists before, or update an existing minority expert model 430. Accordingly, system 100 automatically triggers and performs the generation or updating of minority expert model 430 only when an outlier event is detected based on majority model 420. Process 800 may apply minority expert model 430 so generated or updated at 810 when majority expert model 420 detects a next outlier event at 806. Considering that there are usually many more regular events, system 100 may perform the generation or updating of minority model 430 at a low frequency, thereby reducing system resources devoted to this task.

Process 800 may allow automated generation, updating, and application of an outlier detection model including minority expert model 430 with improved efficiency on time-series events. Merely by way of example, from an initial public offering of a stock, process 800 may monitor the events including the stock price change, trading volume, entities trading the stock, or the like, or a combination thereof. As events occur over time, process 800 may use majority expert model 420 only until majority expert model 420 predicts an outlier event; at that time, process 800 may automatically proceed to generating or updating minority expert model 430, or analyzing the event data set of the event using minority expert model 430.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of two-tier outlier detection that reduces false outlier detection than a machine learning model trained on imbalanced training data.

2. The method of any one or more of the embodiments herein, further comprising: receiving, using control circuitry, an event data set of an event; inputting, using the control circuitry, the event data set of the event to a first machine learning model, wherein the first machine learning model is trained to predict whether the event belongs to an outlier category (e.g., the outlier category may include suspicious activities directed to an electronically access-controlled resource); receiving, from the first machine learning model, a first output predicting whether the event belongs to the outlier category; in response to the first output predicting that the event belongs to the outlier category, inputting, using the control circuitry, the event data set of the event to a second machine learning model, wherein the second machine learning model is trained using event data sets of sample outlier events that include synthetic outlier events, and the second machine learning model is trained to determine whether the event belongs to the outlier category; and generating, using the control circuitry, for output an identifier of the event based on a second output from the second machine learning model, wherein the identifier indicates whether the event belongs to the outlier category.

3. The method of any one or more of the embodiments herein, further comprising: in response to the identifier indicating that the event belongs to the outlier category, generating for output, on a user interface, a recommendation to a user, wherein the recommendation indicates that the event is further reviewed; generating for output, on the user interface, options for the user to select from the options, including at least one of confirming the identifier or modifying the identifier; receiving, via the user interface, a user selection of one of the options; and based on the user selection, generating for output, on the user interface, the confirmed or modified identifier of the event.

4. The method of any one or more of the embodiments herein, wherein receiving, using control circuitry, an event data set of an event comprises: retrieving a plurality of event data sets corresponding to a plurality of respective events; and retrieving, from the plurality of event data sets, each data set as the event data set.

5. The method of any one or more of the embodiments herein, further comprising: generating, based on second outputs determined for the plurality of events, for output a recommended subset among the plurality of events, wherein the recommended subset comprises events that are determined to belong to the outlier category by both the first machine learning model and the second machine learning model.

6. The method of any one or more of the embodiments herein, further comprising: determining a first count of events of the plurality of respective events that are determined to belong to the outlier category by both the first machine learning model and the second machine learning model; determining a second count of events of the plurality of respective events that are determined to belong to the outlier category by the first machine learning model but determined to not belong to the outlier category by the second machine learning model; determining a third count of events of the plurality of respective events that are determined to not belong to the outlier category by the first machine learning model; and generating a confusion matrix based on the first count, the second count, and the third count.

7. The method of any one or more of the embodiments herein, further comprising: retrieving, using the control circuitry, a second event data set of a second event; inputting, using the control circuitry, the second event data set of the event to the first machine learning model; receiving, from the first machine learning model, a third output predicting whether the second event belongs to the outlier category; and in response to the third output predicting that the second event does not belong to the outlier category, not inputting the second event data set of the second event to the second machine learning model.

8. The method of any one or more of the embodiments herein, wherein the outlier category includes a fraud, a bankruptcy event, an event whose risk of being associated with fraud or an ongoing or upcoming bankruptcy exceeds a risk threshold, or an activity whose change or change over a period of time exceeds a threshold.

9. The method of any one or more of the embodiments herein, wherein the first machine learning model is trained to predict whether the event belongs to a regular category that includes activities deemed to be no or low risk (e.g., to the electronically access-controlled resource).

10. The method of any one or more of the embodiments herein, wherein the first machine learning model is trained using event data sets of sample regular events of a regular category that includes activities deemed to be no or low risk (e.g., to the electronically access-controlled resource).

11. The method of any one or more of the embodiments herein, wherein a first count of the sample regular events is used to train the first machine learning model, a second count of the sample outlier events is used to train the second machine learning model, and a ratio of the first count to the second count is below 10, 5, or 2.

12. The method of any one or more of the embodiments herein, wherein the ratio is 1.

13. The method of any one or more of the embodiments herein, wherein the second machine learning model is an unsupervised machine learning model.

14. The method of any one or more of the embodiments herein, wherein the first machine learning model or the second machine learning model comprises at least one of a one-class support vector machine (SVM) model, an isolation forests model, a robust covariance model, or a local outlier factor model.

15. The method of any one or more of the embodiments herein, further comprising: receiving at least one prior outlier event that has actually occurred; and oversampling the at least one prior outlier event based on an oversampling algorithm to produce the synthetic outlier events of the sample outlier events.

16. The method of any one or more of the embodiments herein, wherein the oversampling algorithm comprises at least one of random oversampling, synthetic minority oversampling technique (SMOTE), borderline-SMOTE, borderline oversampling with SVM, or adaptive synthetic sampling (ADASYN).

17. The method of any one or more of the embodiments herein, wherein the second machine learning model comprises a plurality of component models each of which is trained to identify a sub-category of the outlier category.

18. A tangible, non-transitory, machine-readable medium storing instructions that, when executed by a data processing apparatus, cause the data processing apparatus to perform operations comprising those of any one or more of the embodiments 1-17.

19. A system comprising one or more processors and memory storing instructions that, when executed by the processors, cause the processors to effectuate operations comprising those of any one or more of embodiments 1-17.

20. A system comprising means for performing any one or more of embodiments 1-17.

21. A method of outlier detection using a machine learning model that is trained via unsupervised machine learning on oversampled training data.

22. The method of any one or more of the embodiments herein, further comprising: receiving, using control circuitry, an event data set of an event; inputting, using the control circuitry, the event data set of the event to the machine learning model, wherein the machine learning model is trained using the oversampled training data that include synthetic outlier events, and the machine learning model is trained to determine whether the event belongs to an outlier category; and generating, using the control circuitry, for output an identifier of the event based on an output from the machine learning model, wherein the identifier indicates whether the event belongs to the outlier category.

23. The method of any one or more of the embodiments herein, wherein receiving, using control circuitry, an event data set of an event comprises: retrieving a plurality of event data sets corresponding to a plurality of respective events; and retrieving, from the plurality of event data sets, each data set as the event data set, and the method further comprises: for each data set of the plurality of respective events, inputting each event data set into the machine learning model; and generating for output an identifier of the event based on an output from the machine learning model, wherein the identifier indicates whether the event belongs to the outlier category.

24. The method of any one or more of the embodiments herein, further comprising: generating, based on outputs, for output a recommended subset among the plurality of events, wherein the recommended subset comprises events determined to belong to the outlier category by the machine learning model.

25. The method of any one or more of the embodiments herein, further comprising: for each event of the recommended subset, generating for output, on a user interface, a recommendation to a user, wherein the recommendation indicates that the event be further reviewed; providing for output, on the user interface, the event data set of the event or an access to the event data set; generating for output, on the user interface, options for a user to select from, the options including at least one of confirming the identifier or modifying the identifier; receiving, via the user interface, a user selection of one of the options; and based on the user selection, generating for output, on the user interface, the confirmed or modified identifier of the event.

26. The method of any one or more of the embodiments herein, further comprising: determining at least one of: a first count of events of the plurality of respective events; a second count of events of the plurality of respective events that are determined to belong to the outlier category by the machine learning model; or a third count of events of the plurality of respective events that are determined to belong to the outlier category by the machine learning model but determined to not belong to the outlier category by the user; assessing performance of the machine learning model based on at least two of the first count, the second count, or the third count; and generating, for output, a report regarding the performance of the machine learning model.

27. The method of any one or more of the embodiments herein, wherein assessing performance of the machine learning model based on at least two of the first count, the second count, or the third count comprises: generating a confusion matrix based on the first count, the second count, and the third count; and assessing the performance of the machine learning model based on the confusion matrix.

28. The method of any one or more of the embodiments herein, wherein assessing performance of the machine learning model based on at least two of the first count, the second count, or the third count comprises: assessing performance of the machine learning model based on a first ratio of the third count to the first count or a second ratio of the third count to the second count.

29. The method of any one or more of the embodiments herein, further comprising: updating the machine learning model based on the performance.

30. The method of any one or more of the embodiments herein, wherein the machine learning model comprises a plurality of component models each of which is trained to identify a sub-category of the outlier category.

31. The method of any one or more of the embodiments herein, wherein the output from the machine learning model comprises a multi-class result indicating to which one or more sub-categories of the plurality of sub-categories of the outlier category the event belongs.

32. The method of any one or more of the embodiments herein, further comprising: selecting, from a plurality of candidate reactions, a reaction to be performed based on the multi-class result; and performing the selected reaction.

33. The method of any one or more of the embodiments herein, further comprising: obtaining one of the plurality of component models by training an unsupervised machine learning model using at least a portion of the oversampled training data, wherein the at least a portion of the oversampled training data comprise synthetic outlier events deemed to belong to the sub-category of the outlier category that corresponds to the at least one component model.

34. The method of any one or more of the embodiments herein, wherein the oversampled training data that include synthetic outlier events comprise at least one of: (i) a prior outlier event detected by the machine learning model, (ii) a prior outlier event detected by a majority expert model, wherein the majority expert model is trained using event data sets of sample regular events of a regular category that include activities deemed to be no or low risk (e.g., to the electronically accessible resource); (iii) a prior outlier event determined by a user; (iv) a synthetic outlier event determined based on a prior outlier event of any one of (i)-(iii).

35. The method of any one or more of the embodiments herein, wherein the machine learning model is a minority expert model, and before inputting the event data set of the event to the machine learning model, the method further comprises: for an event of a plurality of events, receiving, using the control circuitry, an event data set of the event; inputting, using the control circuitry, the event data set of the event to a majority expert model, wherein the majority expert model is trained using event data sets of sample regular events of a regular category that include activities deemed to be no or low risk; and the majority expert model is trained to predict whether the event belongs to the outlier category, in response to an output from the majority expert model predicting that the event belongs to the regular category, receiving, using the control circuitry, an event data set of a next event from the plurality of events for inputting to the majority expert model.

36. The method of any one or more of the embodiments herein, wherein the machine learning model is a minority expert model, and before inputting the event data set of the event to the machine learning model, the method further comprises: for an event of a plurality of events, receiving an event data set of the event; inputting the event data set of the event to a majority expert model, wherein the majority expert model is trained using event data sets of sample regular events of a regular category that include activities deemed to be no or low risk; and the majority expert model is trained to predict whether the event belongs to the outlier category, in response to an output from the majority expert model predicting that the event does not belong to the regular category, performing at least one of: (a) generating or updating the minority expert model based on the event data set of the event; or (b) inputting the event data set of the event to the minority expert model.

37. The method of any one or more of the embodiments herein, wherein generating or updating the minority expert model based on the event data set of the event comprises: generating one or more synthetic outlier events by oversampling, based on an oversampling algorithm, the event that is determined not to belong to the regular category by the majority expert model or by the minority expert model; and generating or updating the minority expert model using training data including the one or more synthetic outlier events.

38. A tangible, non-transitory, machine-readable medium storing instructions that, when executed by a data processing apparatus, cause the data processing apparatus to perform operations comprising those of any of embodiments 21-37.

39. A system comprising one or more processors and memory storing instructions that, when executed by the processors, cause the processors to effectuate operations comprising those of any of embodiments 21-37.

40. A system comprising means for performing any of embodiments 21-37.

What is claimed is:

1. A system for reducing false outlier detection using a two-tier outlier detection architecture comprising a first-tier model trained on sample regular events and a second-tier model trained on synthetic outlier events to balance the sample regular events, the system comprising:

memory storing computer program instructions; and
one or more processors configured to execute the computer program instructions to effectuate operations comprising:

receiving an event data set of an event;
inputting the event data set of the event to a first-tier machine learning model trained using sample regular event data sets to predict whether the event belongs to an outlier category corresponding to suspicious activities directed to an electronically access-controlled resource;
in response to receiving, from the first-tier machine learning model, a first output indicating that the first-tier machine learning model classified the event into the outlier category, inputting the event data set of the event to a second-tier machine learning model, trained using synthetic outlier event data sets, to predict whether the event belongs to the outlier category corresponding to the suspicious activities;
in response to receiving, from the second-tier machine learning model, a second output indicating that the event has been classified into the outlier category, generating, based on the event and other events classified into the outlier category by both the first-tier machine learning model and the second-tier machine learning model, additional synthetic outlier event data sets to expand an amount of the synthetic outlier event data sets used to train the second-tier machine learning model; and
updating the second-tier machine learning model based on the additional synthetic outlier event data sets.

2. A method comprising:
receiving, using control circuitry, an event data set of an event;
inputting, using the control circuitry, the event data set to a first machine learning model trained to predict whether the event belongs to an outlier category that includes suspicious activities relating to an electronically access-controlled resource;
inputting, based on the first machine learning model indicating that the event belongs to the outlier category, using the control circuitry, the event data set to a second machine learning model is trained using sample outlier event data sets comprising synthetic outlier event data sets, and the second machine learning model is trained to determine whether the event belongs to the outlier category; and
generating, based on the second machine learning model indicating that the event belongs to the outlier category, using the control circuitry, one or more additional synthetic outlier event data sets; and
updating the second machine learning model based on the one or more additional synthetic outlier event data sets.

3. The method of claim 2, further comprising:
generating for output, on a user interface, a recommendation to a user indicating that the event is to be further reviewed;
generating for output, on the user interface, options for the user to select, the options including at least one of (i) confirming an identifier for the event indicating that the first machine learning model and the second machine learning model determined that the event belongs to the outlier category or (ii) modifying the identifier;
receiving, via the user interface, a user selection of one of the options; and
based on the user selection, generating for output, on the user interface, the confirmed identifier or the modified identifier.

4. The method of claim 2, wherein receiving the event data set comprises:
retrieving a plurality of event data sets corresponding to a plurality of respective events; and
selecting, from the plurality of event data sets, the event data set.

5. The method of claim 4, further comprising:
generating, using the first machine learning model, first outputs indicating a first subset of events from the plurality of respective events determined to belong to the outlier category;
generating, using the second machine learning model, second outputs indicating a second subset of events from the plurality of respective events determined to belong to the outlier category;

generating, based on the first outputs and the second outputs, for output, a recommended subset among the plurality of respective events, wherein the recommended subset comprises one or more events determined to belong to the outlier category by both the first machine learning model and the second machine learning model, wherein the first subset of events and the second subset of events comprise the one or more events.

6. The method of claim 5, further comprising:

determining a first count of events included in the recommended subset;

determining a second count of events included in the first subset of events;

determining a third count of events included in the second subset of events; and generating a confusion matrix based on the first count of events, the second count of events, and the third count of events.

7. The method of claim 2, wherein the event data set of the event comprises a first event data set of a first event, the method further comprises:

retrieving, using the control circuitry, a second event data set of a second event;

inputting, using the control circuitry, the second event data set to the first machine learning model; and preventing, based on the first machine learning model indicating that the second event belong to a non-outlier category, using the control circuitry, the second event data set from being input into the second machine learning model.

8. The method of claim 2, wherein the outlier category includes a fraud, a bankruptcy event, an event whose risk of being associated with fraud or an ongoing or upcoming bankruptcy exceeds a risk threshold, or an activity whose change or change over a period of time exceeds a threshold.

9. The method of claim 2, wherein the first machine learning model being trained to predict whether the event belongs to the outlier category comprises classifying, using the first machine learning model, the event into the outlier category or a regular category that includes activities deemed to be no or low risk to the electronically access-controlled resource.

10. The method of claim 2, wherein the first machine learning model is trained using sample regular event data sets of sample regular events of a regular category that include activities deemed to be no or low risk to the electronically access-controlled resource.

11. The method of claim 10, wherein:

a first count of the sample regular event data sets used to train the first machine learning model, a second count of the sample outlier event data sets used to train the second machine learning model, and a ratio of the first count to the second count is below 10, 5, or 2.

12. The method of claim 11, wherein the ratio is 1.

13. The method of claim 2, wherein the second machine learning model is an unsupervised machine learning model.

14. The method of claim 2, wherein the first machine learning model or the second machine learning model comprises at least one of a one-class support vector machine (SVM) model, a one-class SVM, an isolation forests model, a robust covariance model, or a local outlier factor model.

15. The method of claim 2, further comprising:

receiving at least one prior outlier event that has actually occurred; and oversampling the at least one prior outlier event based on an oversampling algorithm to produce the synthetic outlier event data sets.

16. The method of claim 15, wherein the oversampling algorithm comprises at least one of random oversampling, synthetic minority oversampling technique (SMOTE), borderline-SMOTE, borderline oversampling with support vector machine (SVM), or adaptive synthetic sampling (ADASYN).

17. The method of claim 2, wherein the second machine learning model comprises a plurality of component models each of which is trained to identify a sub-category of the outlier category.

18. One or more non-transitory, computer-readable media comprising instructions that, when executed on one or more processors, cause operations comprising:

inputting an event data set of an event to a first machine learning model to determine whether the event belongs to an outlier category;

in response to the event being determined to belong to the outlier category by the first machine learning model, inputting the event data set to a second machine learning model to determine whether the event belongs to the outlier category, wherein the second machine learning model is trained using synthetic outlier event data sets; and generating based on the event being determined to belong to the outlier category by the first machine learning model and the second machine learning model, one or more additional synthetic outlier event data sets to expand the synthetic outlier event data sets used to train the second machine learning model.

19. The one or more non-transitory, computer-readable media of claim 18, wherein the operations further comprise:

retrieving a plurality of event data sets corresponding to a plurality of respective events;

generating, using the first machine learning model, first outputs indicating a first subset of events from the plurality of respective events determined to belong to the outlier category;

generating, using the second machine learning model, second outputs indicating a second subset of events from the plurality of respective events determined to belong to the outlier category; and generating, based on the first outputs and the second outputs, a confusion matrix.

20. The one or more non-transitory, computer-readable media of claim 18, wherein the operations further comprise:

generating for output, on a user interface, a recommendation to a user, indicating that the event is to be further reviewed;

generating for output, on the user interface, options for a user to select, the options including at least one of (i) confirming an identifier for the event indicating that the first machine learning model and the second machine learning model determined that the event belongs to the outlier category or modifying the identifier;

receiving, via the user interface, a user selection of one of the options; and based on the user selection, generating for output, on the user interface, the confirmed identifier or the modified identifier.

* * * * *